Sept. 10, 1963   T. E. YOUNG   3,103,371
BOAT TRAILER
Filed April 1, 1960
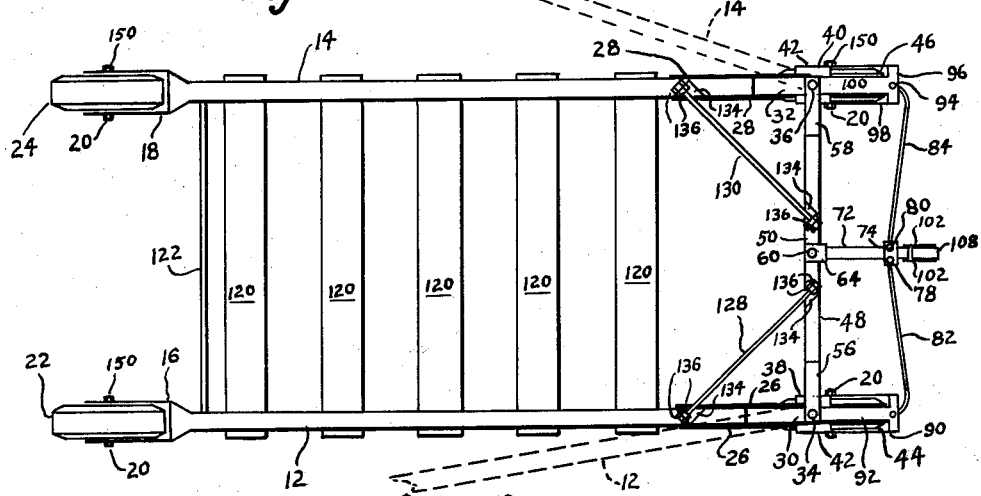
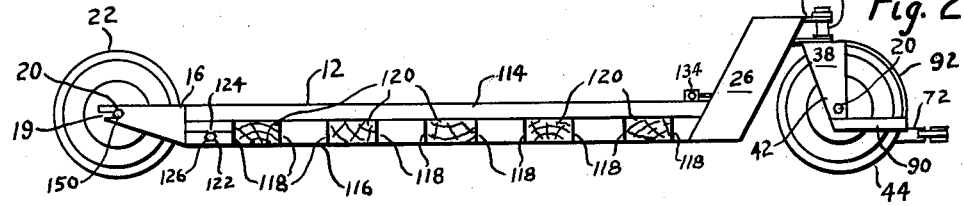
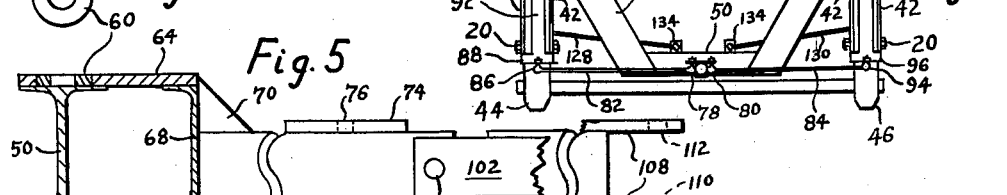
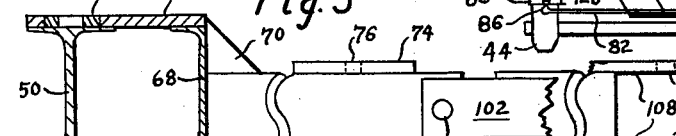
INVENTOR.
THEODORE E. YOUNG
BY Walter J. Kreeke
ATTORNEY

United States Patent Office 3,103,371
Patented Sept. 10, 1963

3,103,371
BOAT TRAILER
Theodore E. Young, S. Main St., Barnstable, Mass.
Filed Apr. 1, 1960, Ser. No. 19,293
3 Claims. (Cl. 280—414)

This invention relates to trailers and more particularly to trailers with particular facility for placing in support position of and for hauling boats and the like under congested conditions.

Boats in the class of pleasure cabin cruisers, because of their substantial weight and size, present serious problems, even to professionals at boat yards, in hauling them in and out of the water and moving them from place to place. These problems are particularly acute where substantial numbers of these boats are stored under crowded conditions in proximate relation to each other. The problems include that of selectively moving desired ones without interfering with the storage position of adjacent boats or other objects.

Pursuant to the present invention, these problems have been overcome in a boat trailer arrangement which also incorporates other desirable features and advantages. Among these other features and advantages achieved by the present invention is that of a relatively inexpensive construction which makes the present trailer economically within the reach of the small boat yard and even individual boat owners.

Another advantage is that it is relatively easy to place in support position under a boat even in the presence of other boats or objects in close proximity, and the time required for such placement is minimal.

Still another advantage is that present trailer is highly useful for both short and long hauls.

Accordingly, a primary object of the present invention is the provision of a trailer which is particularly capable of moving cabin cruiser size pleasure boats under crowded conditions without disturbing adjoining boats and other objects.

A further object is the provision of a trailer which may be placed with relative ease in support position despite surrounding obstacles.

A still further object is the provision of a rugged, yet relatively simple and inexpensive trailer construction.

And a further object is the provision of a trailer which is well adapted for both short and long haul use.

Still another object is the provision of a trailer which may be rapidly disassembled into basic components for rapid reassembly at any convenient location for use, as under a stored boat without disturbing adjoining boats or other objects.

These and other objects, features and advantages are achieved generally by providing a pair of elongated arms carrying rotatively mounted support wheels at one end and pivotally mounted at the other end for lateral movement of the arms about the pivotal mounting, and a structure coupled to the pivotal mounting arrangement adapted for pulling the trailer as by a prime mover.

By providing a plurality of transverse openings or guide positions along the arms for removable load bearing cross members, a versatile arrangement for distributing the load and for rapid disassembly and reassembly of the cross members at the load site is thereby achieved.

By providing a slotted yoke engaging an axle assembly on the support wheels at the support wheel end of each of the arms, provision for quick attachment and detachment of the respective support wheels is thereby achieved as a convenient arrangement for adapting the trailer for easy backing into support position under crowded conditions.

By providing a spacer member with pivotal arrangement for the other end of each of the arms and a pair of front wheels at the spacer member, with capacity for pivoting in a plane perpendicular to the axis of rotation of the front wheels, a suitable arrangement for stabilizing and steering the trailer is thereby achieved.

By providing a quick locking and unlocking arrangement for rigidly holding the arms in place so as to provide rigidly held alignment of the rear and front wheels, an arrangement particularly suitable for long hauls is thereby achieved.

These and other features, objects and advantages will become more apparent from the following description taken in connection with the accompanying drawings of a preferred embodiment of the invention and wherein:

FIG. 1 is a plan view of a trailer made in accordance with the present invention;

FIG. 2 is a side elevation of the trailer shown in FIG. 1;

FIG. 3 is a front view of the trailer shown in FIG. 1;

FIG. 4 is an isometric view to enlarged scale of a bracket used in the FIG. 1 embodiment;

FIG. 5 is a cross sectional view to enlarged scale of a section of the spacer member and a side view of portions of a tow bar used in the FIG. 1 embodiment;

FIG. 6 is a plan view of the pivot washer used in the construction shown in FIG. 5;

FIG. 7 is a side view to enlarged scale of the components in the wheel axle assembly used in the FIG. 1 embodiment.

Referring to FIG. 1 in more detail, a trailer made in accordance with the present invention is designated generally by the numeral 10. The trailer 10 has a pair of elongated arms 12 and 14, each of which has a yoke structure 16 and 18 respectively at one end of each of the arms 12 and 14. Each of the yoke structures 16 and 18 has rotatively mounted in slots 19 therein, on its own axle assembly 20, support wheels 22 and 24 respectively.

The other end of each of the elongated arms 12 and 14 have transverse upwardly extending plate-like structures 26 and 28 rigidly fixed thereto as by welding and to short beam members 30 and 32 respectively, each being mounted to pivot about an associated pivot pin 34 and 36 so as to permit lateral movement about the pivotal mountings 34 and 36 as shown by the dotted lines of the elongated arms 12 and 14 in FIG. 1.

Each of the pivot pins 34 and 36 is rigidly fixed, as by welding, at one end to the top plate of the respective front wheel yoke members 38 and 40. The yoke members 38 and 40 have downwardly depending side plates 42 straddling front support wheels 44 and 46, each mounted in the side plates 42 to rotate on an axle assembly 20.

The pivot pins 34 and 36 are carried in spaced relation to each other at each end of a spacer member 48 comprised of a central beam portion 50 having outwardly and upwardly extending plate-like structures 52 and 54 respectively, each terminating in horizontal supports 56 and 58 for pivotally mounting the pivot pins 34 and 36.

Pivot washers 60 and 62 (FIG. 5) are fixed to the upper and lower sides at the center of the central beam portion 50 so as to pivotally carry the arms 64 and 66 which are fixed by an end piece 68 and gusset 70 to one end of a tow bar 72. The tow bar 72 also has fixed to the top portion thereof a plate 74 with holes 76 for attaching thereto swivel joints 78 and 80 respectively, carried on one end of each of tie rods 82 and 84 respectively. The other end of the tie rod 82 has another swivel joint 86 fixed to the front end of a bracket 88 comprised of a lateral member 90 attached to the bottom of the side plates 42 of the yoke 38 and an arcuate member 92 fixed to the top portion of the yoke member 38. In similar manner, the other end of the tie rod 84 has a swivel joint 94 fixed to the front end of a bracket 96 with horizontal side arms 98 attached to the bottom portion of the yoke 40, and an arcuate portion 100 fixed to the top plate of the yoke 40.

The tow bar 70 carries at its front end a pair of side braces 102 mounted to pivot vertically on a horizontal pin 104. Side braces 102 are rigidly fixed to a short member 106 carrying top and bottom braces 108 with axially aligned holes 110 and 112 for pivotally attaching to a prime mover (not shown). Thus the pivotal mounting holes 110 and 112 with the pivotal pin 104 provides a universal joint arrangement as a towing attachment for the trailer 10. It will be noted that the lateral pivoting movement of the tow bar 72 at the pivot washers 60 and 62 will cause tie rods 82 and 84 to move the front support wheels 44 and 46 in a plane perpendicular to the axis of rotation of the axle assemblies 20 and retain proper parallelism thereof for following the prime mover. The swivel joints 78, 80, 86 and 94 may be of the type commonly used in automobiles.

The elongated side arms 12 and 14 may have an upper portion whose cross section is in the form of an I beam 114 with a bottom structure in the form of an elongated plate 116 carrying a series of vertical ribs 118 so as to form guide openings along each of the arms for receiving load distributing cross members such as timbers 120 which may be easily removed or conveniently slid into position, as desired. It will be noted that in FIGS. 1 and 2, while only half of the openings are shown filled with timbers 120, it should be understood that all of the openings, if needed or desired, may be similarly filled, or any number of them may be filled with timbers 120, depending upon the convenience and requirements of the particular hauling problem involved.

For short hauls, the weight of a boat on the timbers 120 is sufficient to retain the elongated arms 12 and 14 in parallelism for suitable alignment of the back wheels 22 and 24 with the front wheels 44 and 46. However, for long hauls, it is desirable to rigidly lock the elongated arms 12 and 14 in proper parallelism. For this purpose, a locking bar 122 may be quickly inserted at its ends in slots 124 and locked in place by nuts 126 at each end of the locking bar 122.

For additional rigidity in long hauls, transverse locking bars 128 and 130 may be dropped into slots 132 in brackets 134 rigidly fixed in place on the cross members 12 and 14 and the central beam portion 50 of the spacer member 48 and rigidly held in place between nuts 136.

A suitable component structure for the axle assembly 20 for each of the wheels 22, 24, 44 and 46 is shown in FIG. 7 and consists of a flanged sleeve 138 for attaching to the wheels as by screws in holes 140. Bushings 142 and 144 fit in either end of the flanged sleeve 138 and provide bearings for an inner spacer bushing 146 held in place between the respective yoke members by a screw 148 and nut 150.

In the operation of the boat trailer 10, if the boat is of a nature which may be easily placed upon the support members or timbers 120, the trailer for long hauls may be arranged as shown in FIG. 1 with the parallel elongated arms 12 and 14 rigidly held in place by locking rods 122, 128, and 130 as shown, in which event all that is needed is the attachment of a suitable prime mover to tow bar 72 at the pivot holes 110 and 112.

In the event that a boat is in a congested area, the trailer 10 may be quickly disassembled to the degree necessary for placing in support position under the boat without disturbing surrounding objects. Having been so placed, it may then be quickly reassembled for hauling the boat away. For example, for disassembly, all that is necessary is to pull the timbers 120 laterally from the guide openings, loosen the nuts 136 on the transverse locking bars 128 and 130 and lifting the bars out of the slots 132, and loosening the nuts 126 and lifting the locking bar 122 out of the slots 124. Thereupon the elongated arms 12 and 14 may be pivoted laterally as shown by the dotted lines in FIG. 1 to straddle a boat as desired.

Where necessary, further rapid disassembly may be achieved by loosening the nuts 150 of the axle assemblies 20 at the rear support wheels 22 and 24 and quickly removing the support wheels 22 and 24 from slots 19, to thereby make hand manipulation of the elongated arms 12 and 14 easier and more convenient where cramped boat conditions make such action desirable. Once the movable arms 12 and 14 are placed in suitable position under and straddling a boat, the support wheels 22 and 24 may be quickly reinserted in the slots 19 of the rear yokes 16 and 18, the nuts 150 tightened and the timbers 120 replaced as needed, the trailer 10 being thereby ready for movement of the boat for short hauls. For long hauls, locking rod 122 and transverse locking rods 128 and 130 may be rapidly dropped into position in the respective slots 124 and 132 and locked in place by tightening the respective nuts as described above.

This invention is not limited to the particular details of construction and operation described as equivalents will suggest themselves to those skilled in the art.

What is claimed is:

1. In a trailer for hauling boats and the like, the combination of a pair of elongated arms, a yoke at one end of each of the arms, means at each yoke for quick attachment and detachment of a support wheel, a spacer member at the other end of the arms with means pivotally mounting the other end of each of the arms in spaced relation to each other for lateral movement about the pivotal mountings, a pair of front support wheels rotatably mounted at said other end of each of the arms with capacity for pivoting in a plane perpendicular to the axis of rotation, and means coupled to the spacer bar and in steering relation to the front wheels.

2. In combination, a pair of elongated arms, a yoke at one end of each of the arms, means at each yoke for quick attachment and detachment of a rear support wheel, a plurality of guide openings along each of the arms for receiving load distributing cross members, a spacer member at the other end of the arms with means pivotally mounting the other end of each of the arms in spaced relation to each other for lateral movement about the pivotal mountings, a pair of locking means adapted for quick attachment and detachment between the respective arm and spacer member for immovably holding the arms in place with respect to the spacer member, locking bar means at the rear support wheels adapted for quick attachment and detachment to said arms, a pair of front support wheels rotatably mounted at said other ends of the arms with capacity for pivoting in a plane perpendicular to the axis of rotation, and means in steering relation to the front wheels adapted for attachment to a prime mover.

3. In a trailer for hauling boats and the like, a pair of elongated arms, a spacer member at one end of each of the arms pivotally mounting said end of each of the arms in spaced relation to each other and with capacity for lateral movement about the respective pivotal mounting, means for mounting at each of said ends a load bearing wheel for rotation about a wheel axis which is perpendicular to the pivotal axis with the wheels coupled for steering movement in unison about an axis substantially perpendicular to the wheel axes, means at selected positions along the arms for receiving a plurality of load bearing cross members extending from a receiving means on one of the arms to a corresponding receiving means on the other arm when the arms are in load hauling position, a load bearing wheel coupled in load bearing relation to the other end of each of the arms for rotation about a wheel axis substantially parallel to the first mentioned wheel axes when the arms are in said load hauling position.

(References on following page)

References Cited in the file of this patent

UNITED STATES PATENTS

| | | |
|---|---|---|
| 1,973,030 | Webber | Sept. 11, 1934 |
| 2,516,574 | Holly | July 25, 1950 |
| 2,584,672 | Clemons | Feb. 5, 1952 |
| 2,644,176 | Livermon | July 7, 1953 |
| 2,651,498 | Straub | Sept. 8, 1953 |
| 2,706,120 | Stratton | Apr. 12, 1955 |
| 2,812,192 | Cole | Nov. 5, 1957 |

FOREIGN PATENTS

| | | |
|---|---|---|
| 681,430 | Germany | Sept. 22, 1939 |
| 923,818 | Germany | Feb. 21, 1955 |